US010371815B2

(12) United States Patent
Takada

(10) Patent No.: US 10,371,815 B2
(45) Date of Patent: Aug. 6, 2019

(54) RADAR MODULE, TRANSPORT APPARATUS, AND OBJECT DETECTION METHOD

(71) Applicant: Yuji Takada, Tokyo (JP)

(72) Inventor: Yuji Takada, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 303 days.

(21) Appl. No.: 15/300,379

(22) PCT Filed: Mar. 31, 2015

(86) PCT No.: PCT/JP2015/001847
§ 371 (c)(1),
(2) Date: Sep. 29, 2016

(87) PCT Pub. No.: WO2015/151507
PCT Pub. Date: Oct. 8, 2015

(65) Prior Publication Data
US 2017/0139043 A1    May 18, 2017

(30) Foreign Application Priority Data

Mar. 31, 2014 (JP) ................................ 2014-072291

(51) Int. Cl.
*G01S 13/93* (2006.01)
*G01S 7/41* (2006.01)
*G01S 13/00* (2006.01)

(52) U.S. Cl.
CPC ............ *G01S 13/931* (2013.01); *G01S 7/412* (2013.01); *G01S 2013/9332* (2013.01);
(Continued)

(58) Field of Classification Search
CPC ................................ G01S 7/411; G01S 7/2927
See application file for complete search history.

(56) References Cited

U.S. PATENT DOCUMENTS 4,489,319 A * 12/1984 Hansen ................. G01S 7/2927
342/194
4,972,193 A * 11/1990 Rice ........................ G01S 7/412
342/192

(Continued)

FOREIGN PATENT DOCUMENTS

JP    2005-284799 A    10/2005
JP    2006-500664 A    1/2006

(Continued)

OTHER PUBLICATIONS

Extended European Search Report for EP Patent Application No. 15773021.9, dated Dec. 12, 2017.

(Continued)

*Primary Examiner* — Bernarr E Gregory
(74) *Attorney, Agent, or Firm* — Brundidge & Stanger, P.C.

(57) ABSTRACT

This radar module is provided with: a transmission antenna; a reception antenna; a signal source for generating a transmission signal; a transmission unit for transmitting a transmission signal towards a target object through the transmission antenna; a reception unit for receiving, through the reception antenna, a reflected signal produced by reflection of the transmission signal from the target object; a signal processing unit for performing signal processing on the basis of a reception signal outputted by the reception unit; and an external interface for outputting information obtained by the signal processing unit. The signal processing unit calculates an average value and a variance value of the received power of the reception signal, and uses the calculated average value and variance value to identify the target object.

13 Claims, 6 Drawing Sheets

(52) U.S. Cl.
CPC ............... *G01S 2013/9346* (2013.01); *G01S 2013/9375* (2013.01); *G01S 2013/9378* (2013.01)

(56) References Cited

U.S. PATENT DOCUMENTS

| | | | |
|---|---|---|---|
| 5,068,664 A * | 11/1991 | Appriou | G01S 7/412 |
| | | | 342/192 |
| 5,392,050 A * | 2/1995 | Guerci | G01S 7/412 |
| | | | 342/192 |
| 5,867,118 A * | 2/1999 | McCoy | G01S 7/411 |
| | | | 342/192 |
| 6,337,654 B1 * | 1/2002 | Richardson | G01S 7/412 |
| | | | 342/25 A |
| 6,377,205 B1 | 4/2002 | Eckersten et al. | |
| 2005/0012602 A1 | 1/2005 | Knoop et al. | |
| 2006/0072816 A1 * | 4/2006 | Szajnowski | G01S 7/412 |
| | | | 382/168 |
| 2006/0267748 A1 | 11/2006 | Knoop et al. | |
| 2007/0182529 A1 | 8/2007 | Dobler et al. | |
| 2007/0253625 A1 * | 11/2007 | Yi | G01S 7/412 |
| | | | 382/228 |
| 2008/0212653 A1 | 9/2008 | Kurashima et al. | |
| 2010/0076684 A1 * | 3/2010 | Schiffmann | G01S 13/931 |
| | | | 701/301 |
| 2014/0292560 A1 | 10/2014 | Kawasaki et al. | |

FOREIGN PATENT DOCUMENTS

| | | |
|---|---|---|
| JP | 2007-512989 A | 5/2007 |
| JP | 2007-271559 A | 10/2007 |
| JP | 2008-219284 A | 9/2008 |
| JP | 2012-243049 A | 12/2012 |
| JP | 2013-096915 A | 5/2013 |
| JP | 2013-167554 A | 8/2013 |
| WO | 2013064878 A1 | 5/2013 |

OTHER PUBLICATIONS

International Search Report from International Application No. PCT/JP2015/001847 dated Jun. 23, 2015.

* cited by examiner

RADAR MODULE, TRANSPORT APPARATUS, AND OBJECT DETECTION METHOD

TECHNICAL FIELD

The present invention relates to a radar module using a millimeter wave, a transport apparatus provided with the radar module, and an object identification method.

BACKGROUND ART

Conventionally, intelligent transport systems (ITS) which utilize information communication techniques to solve transport problems have been increasingly developed. In this field, for example, a technique has been practically used in which the surrounding environment of an automobile (for example other automobiles, pedestrians, obstructing objects and the like around an automobile) is detected by use of sensors, and safety support operations (for example, warning, brake control and the like) for avoiding unsafe situations or reducing the degree of the unsafe situations are performed based on the detection result.

Radars which use millimeter waves having wavelengths of 1 to 10 mm (frequency: 30 to 300 GHz) (so-called millimeter-wave radar) are publicly known as such sensors. Millimeter-wave radars use radio waves, and are advantageous in ensuring a certain degree of sensitivity even under adverse weather such as rain or fog. Millimeter-wave radars transmit a transmission signal (radio wave) to the surrounding regions of the automobile, and receive and analyze a reflection signal (reflection wave) reflected by a detection target object (hereinafter referred to as "target object") to thereby acquire information relating to the surrounding environment (such as the relative speed and the position (distance, orientation) of the target object).

Millimeter wave sensors have been spread mainly as sensors for vehicle detection for the purpose of avoiding automobile accidents. Further, in recent years, for the purpose of separately detecting artificial objects such as automobiles and pedestrians (human), high-resolution millimeter wave radars using wide-band millimeter wave of 79 GHz band (77 to 81 GHz) have been practically used. For example, PTLS 1 and 2 disclose a technique in which whether a human or not is determined by utilizing the difference (such as dispersion and standard deviation) of the reception power of the reflection signal.

CITATION LIST

Patent Literature

PTL 1
Japanese Patent Application Laid-Open No. 2013-167554
PTL 2
Japanese Patent Application Laid-Open No. 2013-96915

SUMMARY OF INVENTION

Technical Problem

In PTLS 1 and 2, when the difference of the reception power of the reflection signal (for example, variance value) is greater than a reference value, it is determined that the target object is a human. However, the difference of the reception power varies depending on the ratio of the signal quantity to the noise quantity (SNR: Signal to Noise Ratio). For example, even when the target object is an artificial object, the difference of the reception power is large under low SNR environments. Therefore, appropriate setting of the reference value is difficult, and a target object of an artificial object may be mistakenly detected as a human.

An object of the present invention is to provide a radar module, a transport apparatus, and an object identification method which can accurately determine whether the target object is a human or not even under low SNR environments.

Solution to Problem

A radar module according to an embodiment of the present invention includes: a transmission antenna; a reception antenna; a signal source configured to generate a transmission signal; a transmission section configured to send the transmission signal to a target object through the transmission antenna; a reception section configured to receive a reflection signal generated by reflection of the transmission signal on the target object through the reception antenna; a signal processing section configured to perform signal processing based on a reception signal output from the reception section; and an external interface configured to output information obtained at the signal processing section, in which the signal processing section calculates an average value and a variance value of a reception power of the reception signal, and identifies the target object by use of the calculated average value and the calculated variance value.

A transport apparatus according to the embodiment of the present invention includes: the above-mentioned radar module; and a safety driving support operation section configured to perform an operation for avoiding an unsafe situation or reducing the degree of the unsafe situation based on information output from the radar module.

An object identification method according to the embodiment of the present invention of a radar apparatus which sends a predetermined transmission signal and receives a reflection signal generated by reflection of the transmission signal on a target object includes: acquiring a reception power based on the reflection signal; calculating an average value of the reception power; calculating a variance value of the reception power; and identifying the target object by use of the average value and the variance value.

Advantageous Effects of Invention

According to the present invention, the target object is identified by use of the average value and the variance value of the reception power of the reflection wave by utilizing the fact that the radar cross section (RCS) of a human has an exponential distribution, whether the target object is a human or not can be accurately determined even under low SNR environments.

DESCRIPTION OF EMBODIMENTS

In the following, an embodiment of the present invention is described in detail with reference to the accompanying drawings. In the present embodiment, an automobile is described as an example of a transport apparatus according to the embodiment of the present invention.

Figure 1:
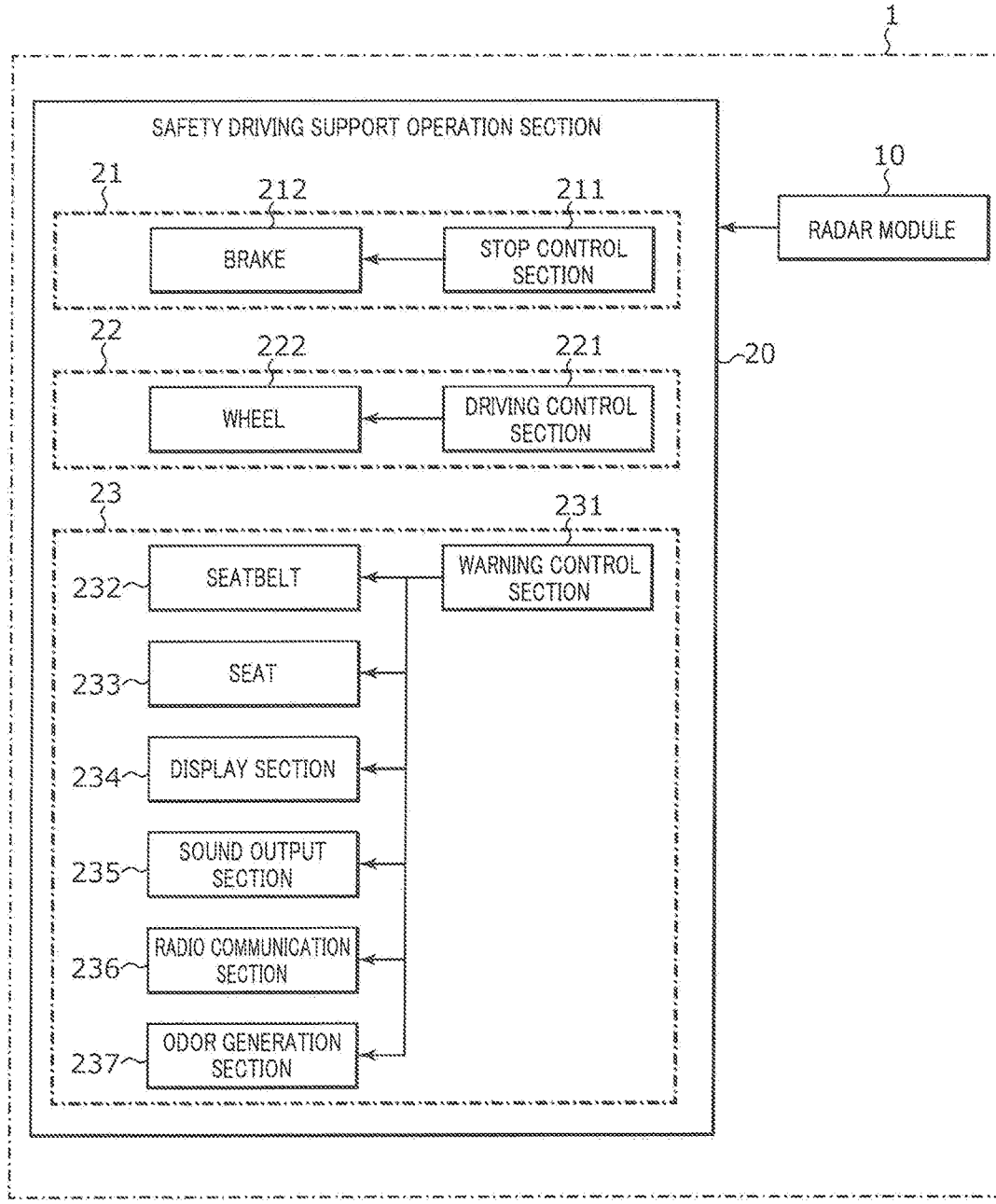
FIG. 1 is a block diagram of a control system relating to safety driving support of an automobile according to an embodiment of the present invention.

FIG. 1 is a block diagram of a control system relating to safety driving support of automobile 1 according to the embodiment of the present invention. As illustrated in FIG. 1, an automobile 1 includes a radar module 10 and a safety driving support operation section 20.

Figure 2:
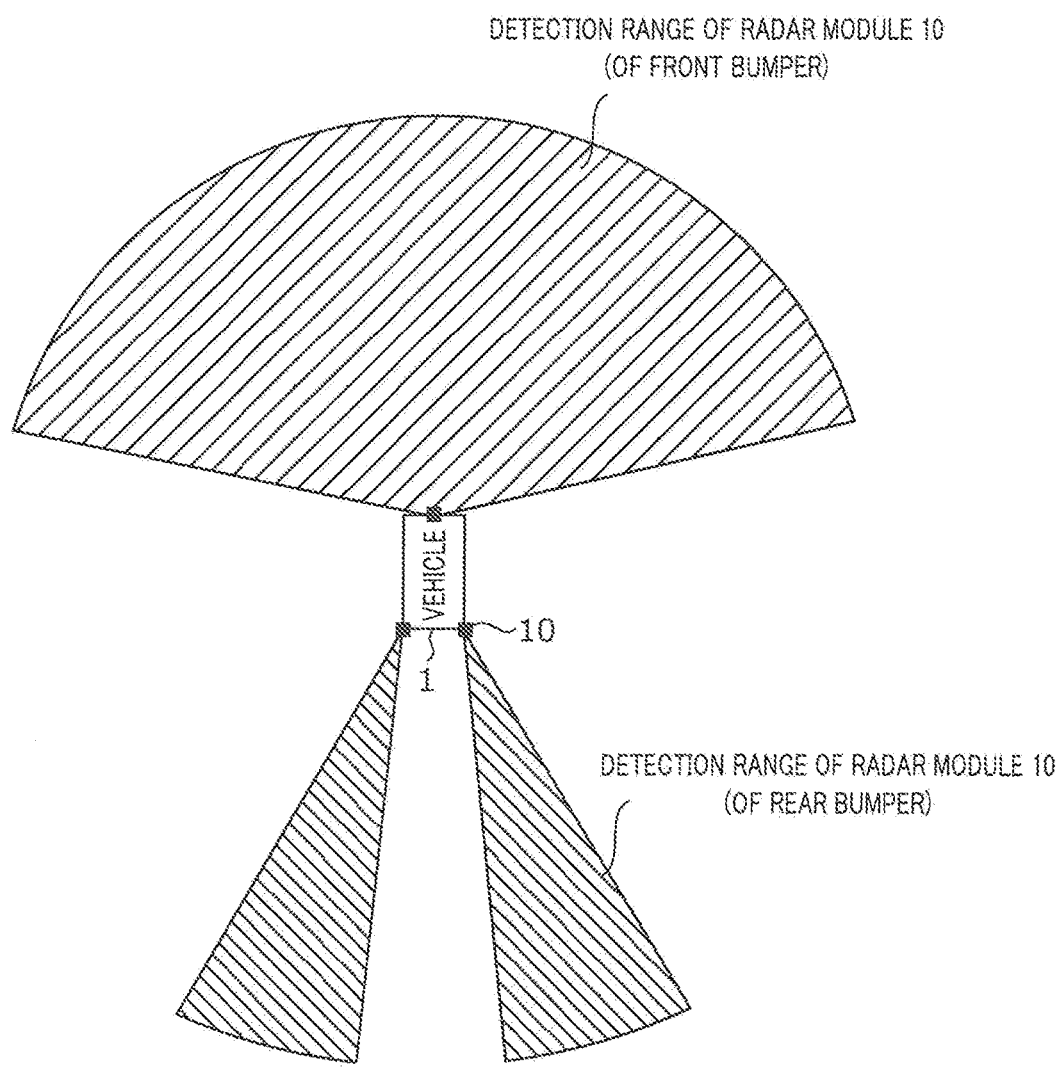
FIG. 2 illustrates a detection range of a radar module.

The radar module 10 is, for example, a millimeter-wave radar of a FMCW (Frequency Modulated Continuous Wave) type which uses a millimeter wave of 79 GHz band. The radar module 10 is disposed at a front bumper and/or a rear bumper of an automobile as illustrated in FIG. 2, for example. FIG. 2 illustrates detection ranges in the case where the radar modules 10 are disposed at a center portion of a front bumper in the vehicle width direction, and both side portions of the rear bumper in the vehicle width direction. With this configuration, a target object which is present at blind spots of the driver can be detected.

The radar module 10 detects the surrounding environment of the automobile 1 (for example, other automobiles, pedestrians, obstructing objects and the like around the automobile), and outputs the information relating to the surrounding environment to the safety driving support operation section 20. The information relating to the surrounding environment includes the presence/absence of the target object, the distance to the target object, and the identification result of the target object (whether the target object is a human or not).

The safety driving support operation section 20 performs a safety driving support operation for avoiding unsafe situation or reducing the degree of the unsafe situation based on the information relating to the surrounding environment output from the radar module 10. Details of the safety driving support operation will be described later.

Figure 3:
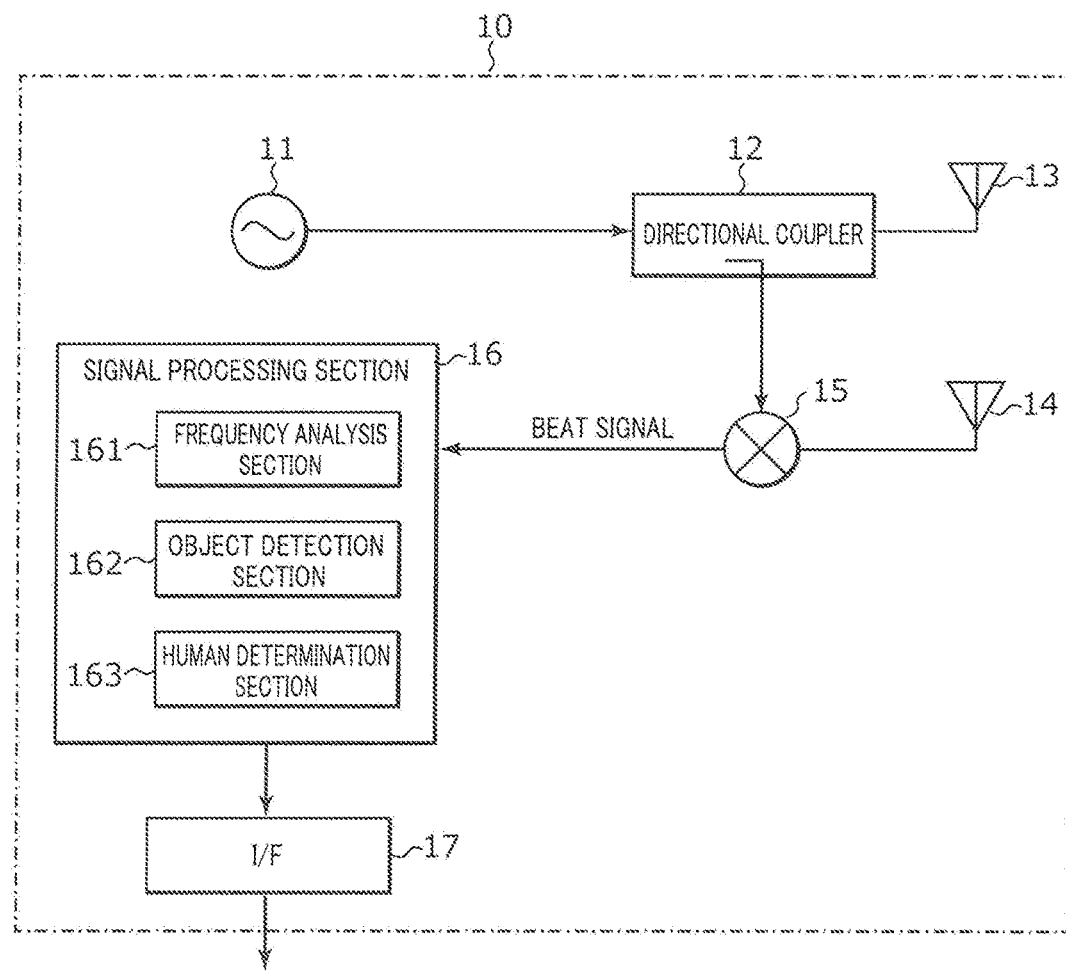
FIG. 3 is a block diagram of a radar module to be mounted in the automobile.

FIG. 3 is a block diagram of the radar module 10 to be mounted in the automobile 1. As illustrated in FIG. 3, the radar module 10 includes a signal source 11, a transmission section 12, a transmission antenna 13, a reception antenna 14, a reception section 15, a signal processing section 16, an external interface 17 and the like.

In the radar module 10, it is possible to apply a one-chip IC in which the signal source 11, the transmission section 12, the reception section 15, the signal processing section 16, and an I/O port (not illustrated) are disposed on one substrate. The transmission antenna 13 and the reception antenna 14 are, for example, composed of a copper foil pattern formed on a printed circuit substrate. A one-chip IC having the signal source 11 and the like, an IC external component, the external interface 17 and the like are mounted to the printed circuit substrate provided with the transmission antenna 13 and the reception antenna 14. This printed circuit substrate is covered with a shield, and thus the configuration of the radar module 10 is obtained.

Signal source 11 generates a frequency modulation (FM) transmission signal by adding triangular wave modulation signal to a control voltage of a voltage controlled oscillator (VCO: Voltage Controlled Oscillator).

The transmission section 12 includes a directional coupler which outputs a transmission signal to the transmission antenna 13, and distributes a part of the transmission signal to the reception section 15, for example.

The transmission antenna 13 radiates a transmission signal as a transmission wave to the surrounding regions of the automobile 1. When reaching the target object, the transmission wave is reflected in accordance with the reflectance of the target object.

The reception antenna 14 receives a reflection signal generated by reflection at the target object and outputs the signal to the reception section 15.

The reception section 15 includes a mixer which mixes a reflection signal output from the reception antenna 14 and a transmission signal output from the transmission section 12 (directional coupler) to generate a beat signal (reception signal), for example. The reception section 15 outputs the generated beat signal to the signal processing section 16.

The signal processing section 16 includes a frequency analysis section 161, an object detection section 162, and a human determination section 163.

The frequency analysis section 161 performs frequency analysis by executing processes such as fast fourier transform (FFT) on a beat signal digitized with an AD convertor (not illustrated).

On the basis of the frequency distribution (the peak of beat frequency) of the beat signal calculated at the frequency analysis section 161, the object detection section 162 detects a target object, and calculates the distance to the detected target object and the relative speed with respect to the target object.

The human determination section 163 determines whether the detected target object is a human based on the reception power of the beat signal of the detected target object. The object identification process in the human determination section 163 will be described later.

The information relating to the surrounding environment generated at the signal processing section 16 is output to the safety driving support operation section 20 through the external interface 17.

Figure 4:
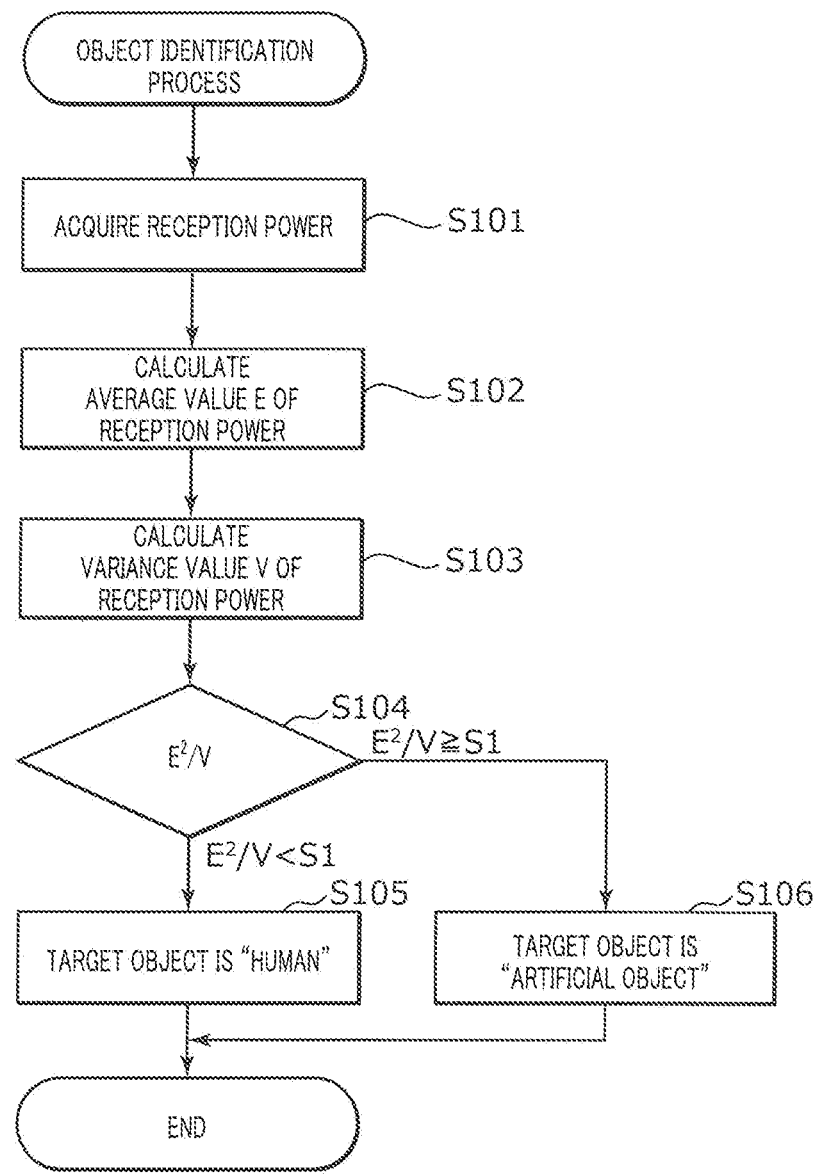
FIG. 4 is a flowchart of an example object identification process in a human determination section.

FIG. 4 is a flowchart of an example object identification process of the human determination section 163. The object identification process of FIG. 4 is started when object detection section 162 detects a new target object, for example. It is to be noted that the beat signal input to the signal processing section 16 is stored in a storage section (not illustrated) for a predetermined period.

At step S101, the human determination section 163 acquires multiple pieces of reception power $P_r$ of the beat signal of the detected target object. To acquire a stable distribution of the reception power $P_r$, the number of the data to be acquired is preferably seven or more.

At step S102, the human determination section 163 calculates average value E of the reception power $P_r$.

At step S103, the human determination section 163 calculates variance value V of reception power $P_r$.

At step S104, the human determination section 163 compares the square of average value E and variance value V. When determination index $E^2/V$ obtained by dividing the square of average value E by variance value V is smaller than first reference value S1, the process is advanced to step S105. When determination index $E^2/V$ is greater than first reference value S1, the process is advanced to step S106. The "first reference value S1" is a value used for identification of the target object by determination index $E^2/V$, and is set to 1 or a value approximately equivalent to 1.

At step S105, the human determination section 163 determines that the detected target object is "human."

At step S106, human determination section 163 determines that the detected target object is "artificial object."

Incidentally, the reception power $P_r$ of a radar in a free space is as expressed in Expression (1).

[Ex 1]

$$P_r = P_t G^2 \lambda^2 \sigma / (4\pi)^3 R^4 \quad (1)$$

$P_t$: Transmission power
G: Antenna gain
$\lambda$: Wavelength
$\sigma$: Radar cross section (RCS)
R: Distance to target object In Expression (1), the items other than the radar cross section (RCS) $\sigma$ are considered to be constant values, and therefore the reception power $P_r$ is proportional to RCS. When the target object is a human, RCS is not a constant value and varies since the surface of a human is vibrating. When it is assumed that RCS is set in accordance with the exponential distribution, the reception power $P_r$ is also set in accordance with the exponential distribution. Here, it was confirmed by experiment that the reception power $P_r$ is close to the exponential distribution in the case where the target object is a human.

Figure 6:
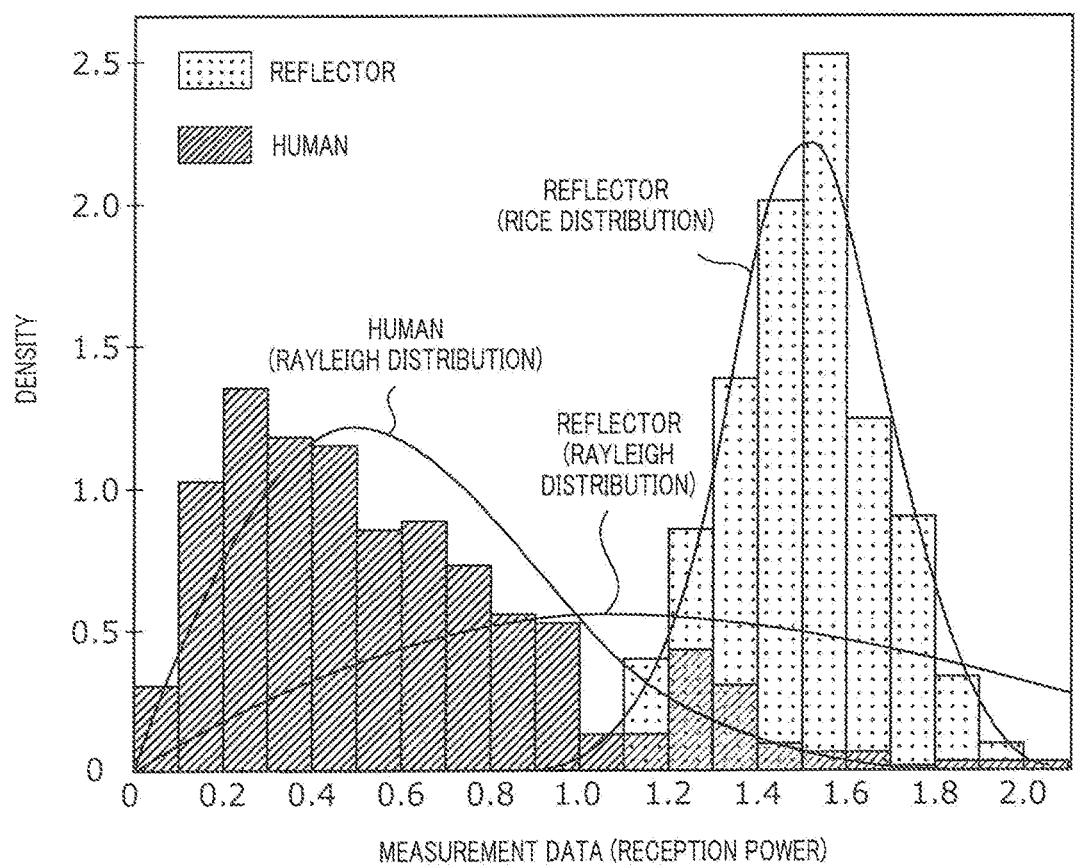
FIG. 6 is a histogram showing a measurement result (distribution) of a reception power in the case where the target object is a human and an artificial object.

FIG. 6 is a histogram showing measurement results (distribution) of the reception power in the case where the target object is a human and an artificial object (here, a reflector). It can be said from FIG. 6 that the distribution of the measurement data of a reflector is close to Rice distribution, and the distribution of the measurement data of a human is close to Rayleigh distribution. In view of this, it can be said that the reception power $P_r$ in the case where the target object is a human is set in accordance with the exponential distribution.

Figure 5:
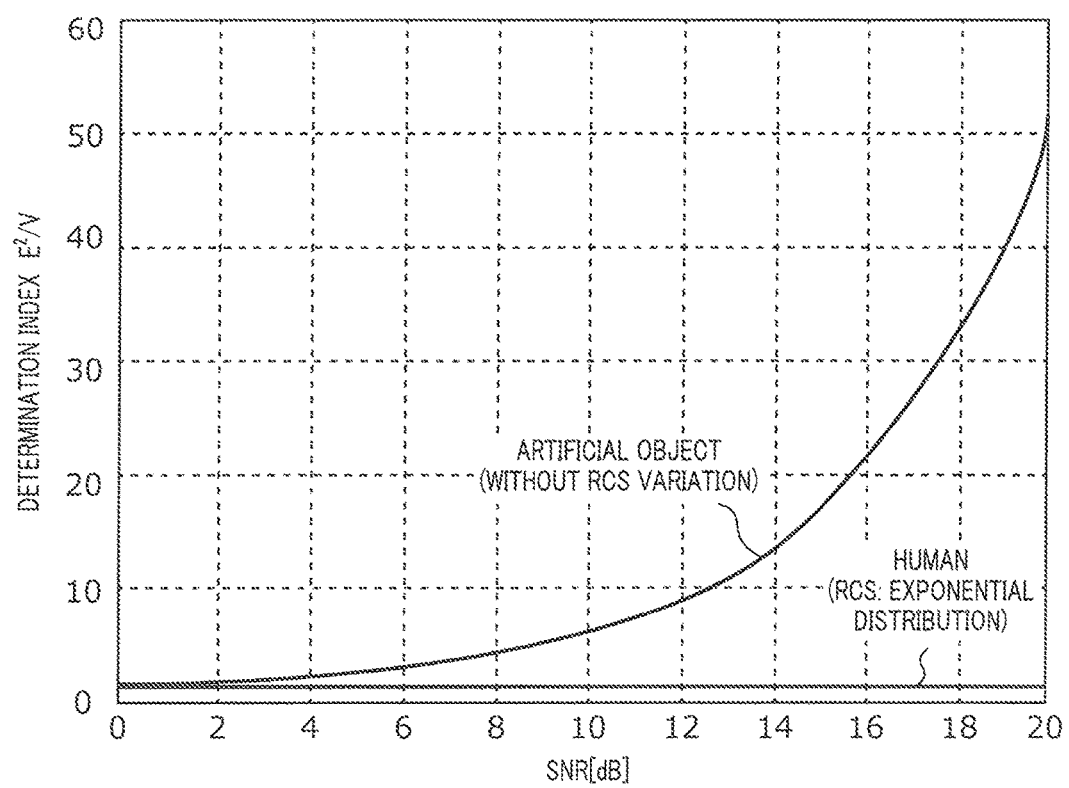
FIG. 5 illustrates variation of a determination index in the case where the target object is a human and an artificial object.

Accordingly, ideally, the square of an average value E and a variance value V of the reception power $P_r$ are equal to each other, that is, $E^2/V=1$ when the target object is a human. This relationship does not change regardless of SNR as illustrated in FIG. 5.

On the other hand, it is considered that RCS is a constant value in the case where the target object is an artificial object (a vehicle or the like) other than a human. In this case, the difference of the reception power $P_r$ varies in accordance with SNR, and the square of the average value E of the reception power $P_r$ is obviously greater than the variance value V, that is, $E^2/V > 1$ (see FIG. 5).

In view of this, when the ratio $E^2/V$ of the square of the average value E to the variance value V of the reception power $P_r$ is used as a determination index, it is possible to accurately determine whether the target object is a human or an artificial object other than a human. In addition, as illustrated in FIG. 5, a determination index $E^2/V$ of the case where the target object is a human and the determination index $E^2/V$ of the case where the target object is an artificial object are largely different from each other, and therefore a proper first reference value S1 can be readily set.

As described, the radar module 10 includes: the transmission antenna 13, the reception antenna 14, the signal source 11 configured to generate a transmission signal, the transmission section 12 configured to send the transmission signal to a target object through the transmission antenna 13, the reception section 15 configured to receive a reflection signal generated by reflection of the transmission signal on the target object through the reception antenna 14, the signal processing section 16 configured to perform signal processing based on a reception signal (beat signal) output from the reception section 15; and the external interface 17 configured to output information obtained at the signal processing section 16. The signal processing section 16 (the human determination section 163) calculates the average value E and the variance value V of the reception power $P_r$ of the reception signal, and identifies the target object by use of the calculated average value E and the calculated variance value V.

To be more specific, the signal processing section 16 (the human determination section 163) compares the square of the average value E and the variance value V of the reception power Pr, and determines that the target object is a human when the determination index $E^2/V$ which is obtained by dividing the square of average the value E by the variance value V is smaller than the first reference value S1 which is set to 1 or a value approximately equivalent to 1.

Since the radar module 10 uses the average value E and the variance value V of the reception power $P_r$ of the reception signal to identify the target object by utilizing a fact that RCS of a human has an exponential distribution, it is possible to accurately determine whether the target object is a human or not even under low SNR environments.

The identification result of the target object obtained at the human determination section 163 of the radar module 10 is output to the safety driving support section 20 as information relating to the surrounding environment together with the presence/absence of the target object, the distance to the target object and the like. The safety driving support operation section 20 performs the safety driving support operation for avoiding unsafe situation or reducing the degree of the unsafe situation based on the information relating to the surrounding environment.

As illustrated in FIG. 1, the safety driving support operation section 20 includes a stop operation section 21, a driving operation section 22, and a warning section 23.

The stop operation section 21 supports a stop operation of the automobile 1 based on the information relating to the surrounding environment. To be more specific, under the control of a stop control section 211, a brake 212 is activated, and the automobile 1 is automatically decelerated or stopped. With this configuration, the unsafe situation can be quickly avoided.

A driving operation section 22 supports a driving operation of the automobile 1 based on the information relating to the surrounding environment. To be more specific, under the control of a driving control section 221, a wheel 222 is activated, and the travelling direction of the automobile 1 is automatically changed. With this configuration, the unsafe situation can be quickly avoided.

A warning section 23 issues a warning to a passenger or outside based on the information relating to the surrounding environment. To be more specific, under the control of a warning control section 231, a seatbelt 232 is automatically wound up to stimulate the passenger. The passenger can recognize the unsafe situation by perceiving the change of the touch of the seatbelt 232.

In addition, under the control of the warning control section 231, a seat 233 vibrates to stimulate the passenger. By perceiving the change of the touch on passenger which is caused by the seat 233, the passenger can recognize the unsafe situation.

In addition, under the control of the warning control section 231, a display section 234 issues a warning on the display. Applicable examples of the display section 234 include a liquid crystal display of a car navigation system and the like, a front glass, eyeglasses or a head up display of the passenger, a rear-view monitor and the like.

The display section 234 issues a warning to the passenger by indicating the direction of a human on the display section 234 in 2D, and/or by changing the color of the display (background color) of the display section 234 in accordance with the distance to a human (blue (safe), yellow (intermediate) or red (unsafe)), for example. The passenger can visually recognize the unsafe situation.

In addition, under the control of the warning control section 231, a sound output section (speaker) 235 issues a warning with a sound. The passenger can recognize the unsafe situation by the sense of hearing.

In addition, under the control of the warning control section 231, a radio communication section 236 sends warning information to a mobile terminal (for example, a smartphone) owned by the passenger or the pedestrian. When the mobile terminal receives the warning information, a warning is issued with an indication on the display or a sound. The passenger or the pedestrian can recognize the unsafe situation from the information from his or her mobile terminal.

In addition, under the control of the warning control section 231, an odor generation section 237 generates odor. The passenger can recognize the unsafe situation by the sense of smell.

Furthermore, unsafe situations may be indicated with flashing of the head light, or a horn. In addition, the way of illumination of the head light may be changed in accordance with the distance to the target object or the direction of the target object.

In the automobile 1, safety the driving support operation section 20 performs the above-described operation based on the information relating to the surrounding environment, and thus not only the safety of the automobile itself, but also the safety of the other automobiles and pedestrians is remarkably ensured.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, as the determination index for determining that the target object is a human, a value obtained by subtracting the variance value V from the square of the average value E of the reception power $P_r$ ($E^2-V$) may also be used. In this case, when the determination index ($E^2-V$) is smaller than a second reference value which is set to 0 or a value approximately equivalent to 0, it is determined that the target object is a human It should be noted that the difference between the determination index ($E^2-V$) of the case where the target object is a human and the determination index ($E^2-V$) of the case where the target object is an artificial object is smaller than that of the case where the determination index of $E^2/V$ is used, and appropriate setting of the second reference value becomes difficult, and therefore, it is preferable to use $E^2/V$ as the determination index.

In addition, the radar module 10 of a pulse type or an FSK (Frequency Shift Keying) type may also be used as well as the radar module 10 of the FMCW type.

In addition, the radar module according to the embodiment of the present invention may be mounted in a transport apparatus such as a railroad vehicle, a ship, and a plane, or a road side machine installed on a road as well as in an automobile. Other radar modules (for example, a 76-GHz millimeter-wave radar) and a sensor such as a stereo camera which are combined together may also be mounted in a transport apparatus. When a plurality of sensors are mounted, the surrounding environment of the transport apparatus can be more correctly determined.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof. Although embodiments of the present invention has been described and illustrated in detail, it is clearly understood that the same is by way of illustrated and example only and is not to be taken by way of limitation, the scope of the present invention being interpreted by terms of the appended claims.

This application is entitled to and claims the benefit of Japanese Patent Application No. 2014-072291 dated Mar. 31, 2014, the disclosure of which including the specification, drawings and abstract is incorporated herein by reference in its entirety.

REFERENCE SIGNS LIST

1 Automobile (transport apparatus)
10 Radar module
11 Signal source
12 Transmission section
13 Transmission antenna
14 Reception antenna
15 Reception section
16 Signal processing section
17 External interface
20 Safety driving support operation section
161 Frequency analysis section
162 Object detection section
163 Human determination section

The invention claimed is:
1. A radar module, comprising:
a transmission antenna;
a reception antenna;
a signal source configured to generate a transmission signal;
a transmission section configured to send the transmission signal to a target object through the transmission antenna;
a reception section configured to receive a reflection signal generated by reflection of the transmission signal on the target object through the reception antenna;
a signal processing section configured to perform signal processing based on a reception signal output from the reception section; and
an external interface configured to output information obtained at the signal processing section,
wherein the signal processing section:
calculates an average value and a variance value of a reception power of the reception signal,
detects the target object by use of the calculated average value and the calculated variance value,
performs a comparison using the variance value and a square of the average value, and
determines that the target object is a human when a determination index obtained by dividing the square of the average value by the variance value is smaller than a first reference value which is set to 1 or a value approximately equivalent to 1.

2. A radar module, comprising:
a transmission antenna;
a reception antenna;
a signal source configured to generate a transmission signal;
a transmission section configured to send the transmission signal to a target object through the transmission antenna;
a reception section configured to receive a reflection signal generated by reflection of the transmission signal on the target object through the reception antenna;
a signal processing section configured to perform signal processing based on a reception signal output from the reception section; and
an external interface configured to output information obtained at the signal processing section,
wherein the signal processing section:
    calculates an average value and a variance value of a reception power of the reception signal,
    detects the target object by use of the calculated average value and the calculated variance value,
    performs a comparison using the variance value and a square of the average value, and
    determines that the target object is a human when a determination index obtained by subtracting the variance value from the square of the average value is smaller than a second reference value which is set to 0 or a value approximately equivalent to 0.

3. A transport apparatus comprising:
a radar module; and
a safety driving support operation section configured to perform an operation for avoiding an unsafe situation or reducing a degree of the unsafe situation based on information output from the radar module,
the radar module including:
    a transmission antenna;
    a reception antenna;
    a signal source configured to generate a transmission signal;
    a transmission section configured to send the transmission signal to a target object through the transmission antenna;
    a reception section configured to receive a reflection signal generated by reflection of the transmission signal on the target object through the reception antenna;
    a signal processing section configured to perform signal processing based on a reception signal output from the reception section; and
    an external interface configured to output information obtained at the signal processing section,
    wherein the signal processing section:
        calculates an average value and a variance value of a reception power of the reception signal,
        detects the target object by use of the calculated average value and the calculated variance value, and
        performs a comparison using the variance value and a square of the average value.

4. The transport apparatus according to claim 3, wherein the safety driving support operation section includes a stop operation section configured to support a stop operation of the transport apparatus based on the information output from the radar module.

5. The transport apparatus according to claim 3, wherein the safety driving support operation section includes a driving operation section configured to support a driving operation of the transport apparatus based on the information output from the radar module.

6. The transport apparatus according to claim 3, wherein the safety driving support operation section includes a warning section configured to issue a warning to a passenger or outside of the transport apparatus based on the information output from the radar module.

7. The transport apparatus according to claim 6, wherein the warning section includes a display section configured to issue a warning by indication on a display.

8. The transport apparatus according to claim 6, wherein the warning section includes a sound output section configured to issue a warning by a sound.

9. The transport apparatus according to claim 6, wherein the warning section includes an odor generation section configured to issue a warning by outputting an odor.

10. The transport apparatus according to claim 6, wherein the warning section includes a stimulation section configured to issue a warning by changing a touch on a passenger.

11. The transport apparatus according to claim 6, wherein the warning section includes a radio communication section configured to wirelessly send information representing a warning.

12. An object detection method of a radar apparatus which sends a predetermined transmission signal and receives a reflection signal generated by reflection of the transmission signal on a target object, the detection method comprising:
    acquiring a reception power based on the reflection signal;
    calculating an average value of the reception power;
    calculating a variance value of the reception power;
    detecting the target object by use of the average value, the variance value, and a square of the average value, and
    determining that the target object is a human when a determination index obtained by dividing the square of the average value by the variance value is 1.

13. An object detection method of a radar apparatus which sends a predetermined transmission signal and receives a reflection signal generated by reflection of the transmission signal on a target object, the detection method comprising:
    acquiring a reception power based on the reflection signal;
    calculating an average value of the reception power;
    calculating a variance value of the reception power; and
    detecting the target object by use of the average value, the variance value, and a square of the average value, and
    determining that the target object is a human when a determination index obtained by subtracting the variance value from the square of the average value is 0.

* * * * *